United States Patent [19]

Tabb

[11] Patent Number: 5,700,866
[45] Date of Patent: Dec. 23, 1997

US005700866A

[54] CO-CURABLE BASE RESISTANT FLUOROELASTOMER BLEND COMPOSITION

[75] Inventor: David Leo Tabb, Wilmington, Del.

[73] Assignee: E. I. Du Pont de Nemours and Company, Wilmington, Del.

[21] Appl. No.: 673,942

[22] Filed: Jul. 1, 1996

Related U.S. Application Data

[63] Continuation-in-part of Ser. No. 517,865, Aug. 22, 1995, abandoned.

[51] Int. Cl.$^6$ .............................. C08L 27/18; C08L 33/06
[52] U.S. Cl. ...................... 524/520; 525/194; 525/199
[58] Field of Search ........................ 525/194, 199; 524/520

[56] References Cited

U.S. PATENT DOCUMENTS

| | | | |
|---|---|---|---|
| 3,467,635 | 9/1969 | Brasen et al. | 260/80.76 |
| 4,251,399 | 2/1981 | Tomoda et al. | 260/4 R |
| 4,456,654 | 6/1984 | Kotian | 428/383 |
| 5,206,293 | 4/1993 | Sakai et al. | 525/194 |
| 5,412,034 | 5/1995 | Tabb | 525/194 |

FOREIGN PATENT DOCUMENTS

| | | |
|---|---|---|
| 0 422 960A | 4/1991 | European Pat. Off. . |
| 016412 | 1/1986 | Japan . |
| 015244 | 1/1987 | Japan . |
| 245047 | 9/1990 | Japan . |
| 149250 | 6/1991 | Japan ..................... 525/199 |
| 123788 | 4/1992 | Japan . |

OTHER PUBLICATIONS

Patent Abstracts of Japan vol. 015, No. 100 (C–0813), Mar. 1991 & JP 02 311548A (Kurabe:KK) Dec. 1990.

Patent Abstracts of Japan vol. 016, No. 384 (M–1296), Aug. 1992 JP 04 125122A (Kurabe:KK) Apr. 1992

Patent Abstracts of Japan vol. 014, No. 086 (C–0690), Feb. 1990 & JP 01 299859A (Japan Synhetic Rubber Co. Ltd., Dec. 1989.

*Primary Examiner*—David Buttner

[57] ABSTRACT

Fluoroelastomer blend compositions having excellent base resistance and low temperature properties comprise a fluoroelastomer component which is a copolymer of tetrafluoroethylene and an olefin, and an elastomeric ethylene copolymer component which is a copolymer of ethylene and an alkyl acrylate or an alkyl methacrylate.

17 Claims, No Drawings

CO-CURABLE BASE RESISTANT FLUOROELASTOMER BLEND COMPOSITION

CROSS-REFERENCE TO RELATED APPLICATION

This is a continuation-in-part of application Ser. No. 08/517,865 filed Aug. 22, 1995 now abandoned.

BACKGROUND OF THE INVENTION

This invention relates to co-curable blends of fluoroelastomers and ethylene copolymer elastomers. In particular, this invention relates to fluoroelastomer blend compositions having excellent resistance to bases, wherein the fluoroelastomer component is a copolymer of tetrafluoroethylene and an olefin.

Fluoroelastomers and ethylene copolymer elastomers exhibit significant differences in low temperature flexibility and resistance to aggressive automotive fluids. There is also a significant cost differential between the two classes of elastomers. An elastomer having performance characteristics approaching those of fluoroelastomers, but which is available at the cost of hydrocarbon elastomers has long been desired. Previous attempts to satisfy this need by blending fluoroelastomer compositions with hydrocarbon elastomers have met with limited success because the two classes of elastomers are incompatible. Although certain prior art compositions have been disclosed which overcome this incompatibility, compositions exhibiting a combination of outstanding base resistance and low temperature properties have not been heretofore available.

For example, Tomoda et al., in U.S. Pat. No. 4,251,399, disclose a co-crosslinkable, peroxide-curable blend of iodine-containing fluoroelastomer and hydrocarbon elastomer. The Tomoda reference teaches that conventional fluoroelastomers (e.g., elastomers which do not contain iodine) are crosslinkable with organic peroxides, but that practical use of them has not been made because of their inferior crosslinkability.

Sakai et at., in U.S. Pat. No. 5,206,293, disclose a rubber composition obtained by subjecting a mixture of fluoroelastomer; polyethylene or an ethylene copolymer; and organic peroxide to reaction while imparting a shearing deformation to the mixture. The ethylene copolymers disclosed in the Sakai reference contain relatively low amounts of polar comonomers and are thermoplastic, not elastomeric. Sakai teaches that blends of fluoroelastomers with elastomers having polar groups have unsatisfactory performance characteristics because a uniform mixture is difficult to obtain. Therefore, Sakai describes a dynamic method for partially curing the polymer blend of his invention, which results in crosslinking of the ethylenic resin but not of the fluoroelastomer. The rubber composition disclosed in Sakai can subsequently be further cured by adding a crosslinking agent for the fluoroelastomer. It is taught that, when a crosslinking agent for the fluoroelastomer alone is compounded with a mixture of fluoroelastomer and ethylenic resin (which may contain filer and the like), it is impossible to obtain an extrudate of complex shape. There is no disclosure of simultaneous crosslinking of fluoroelastomer and elastomeric ethylenic resin with desirable results.

Kotian, in U.S. Pat. No. 4,456,654, discloses an elastomeric blend composed of a tetrafluoroethylene/propylene copolymer and a minor amount of a copolymer of ethylene and methyl acrylate as a non-preferred composition in a comparative example. The particular composition also contains substantial amounts of hydrated alumina filler. The reference is generally directed to elastomeric flame retardant compositions for electrical cable.

Tabb, in U.S. Pat. No. 5,412,034, discloses co-curable elastomeric blends of fluoroelastomers and hydrocarbon elastomers in which at least one of the fluoroelastomer and hydrocarbon elastomer contains a copolymerized cure site monomer.

None of the above-described compositions exhibits the combination of outstanding base resistance, low temperature properties, and processability necessary for use in applications in which basic environments are encountered over wide temperature ranges.

SUMMARY OF THE INVENTION

The present invention provides co-curable blends of fluoroelastomers and ethylene copolymer elastomers, wherein neither polymeric blend component contains a copolymerized curesite monomer. When cured, the polymer blends are elastomeric compositions which exhibit excellent base resistance, low temperature resistance, and processability.

Specifically, the present invention provides a co-curable elastomeric blend composition comprising:
(A) at least about 15 percent by weight, based on the total weight of components (A) and (B), of a copolymer comprising copolymerized units of tetrafluoroethylene and an olefin, and having at least about 45 weight percent fluorine; and
(B) at least 5 percent by weight, based on the total weight of components (A) and (B), of at least one ethylene copolymer comprising copolymerized units of
  (1) ethylene and
  (2) at least one polar comonomer selected from the group consisting of alkyl acrylates and alkyl methacrylates, wherein the polar comonomer comprises at least 55–80 percent by weight of said ethylene copolymer;
wherein neither the copolymer of component (A) nor the copolymer of component (B) contains a copolymerized curesite monomer.

A further embodiment of the present invention provides for a co-curable elastomeric blend comprising:
(A) at least about 5 percent by weight, based on the total weight of components (A) and (B), of a copolymer having copolymerized units of tetrafluoroethylene and an olefin, and having at least about 45 weight percent fluorine;
(B) at least 5 percent by weight, based on the total weight of components (A) and (B), of at least one ethylene copolymer comprising copolymerized units of
  (1) ethylene and
  (2) at least one polar comonomer selected from the group consisting of alkyl acrylates and alkyl methacrylates, wherein the polar comonomer comprises at least 55–80 percent by weight of said ethylene copolymer; and
(C) not more than 150 parts by weight of a filler per hundred parts by weight of the components (A) and (B);
wherein neither the copolymer of component (A) nor the copolymer of component (B) contains a copolymerized curesite monomer.

DETAILED DESCRIPTION OF THE INVENTION

The fluoropolymers which are particularly useful as components of the elastomeric blend compositions of this invention are described by Brasen et at. in U.S. Pat. No. 3,467,635. Specifically, suitable fluoropolymers are elastomeric compositions having copolymerized tetrafluoroethylene units and olefin units in the mole ratio of about 1:0.6–1.2, with the olefin units being selected from (1) 50–100 mole percent of units of propylene, butene-1, and mixtures thereof and with the remainder of the olefin units being selected from 0 to 50 mole percent ethylene or isobutylene and (2) ethylene and isobutylene in about 1:1 molar proportion. The fluorine content of the elastomers is at least 45 weight percent. Elastomeric tetrafluoroethylene/propylene copolymers, i.e., fluoroelastomers, are particularly of interest. Such compositions may be prepared by emulsion copolymerization of tetrafluoroethylene and propylene and are commercially available, e.g., as Atlas® fluoroelastomer from Asahi Glass Co., Ltd., Tokyo, Japan. Such polymers contain about 56 mole percent (75 wt. %) tetrafluoroethylene and are capable of reaction with peroxide crosslinking systems to produce cured elastomeric compositions, even though a curesite monomer or unit is not present as a copolymerized unit in the polymer chain. A curesite monomer or unit is described in Brasen as a moiety which can be added in small amounts, i.e. less than 3 mole percent, to the copolymerization mixture to effect crosslinking. Examples of such cure-site monomers or units include —COOH, which can crosslink with metal oxides; reactive halogen, which can crosslink with amines; and a compound containing a non-polymerizable carbon-carbon double bond, which can be crosslinked with sulfur.

Fluoropolymers suitable for use in the practice of the invention may also contain other comonomers in addition to tetrafluoroethylene and olefins. For example, specifically desirable types of fluoroelastomers are copolymers comprising from 20 to 60 mole percent of tetrafluoroethylene, from 20 to 50 mole percent of propylene, and from 3 to 70 mole percent of vinylidene fluoride. Copolymers comprising 4 to 50 mole percent vinylidene fluoride are especially preferred. Such compositions may be prepared by emulsion copolymerization and are commercially available from Asahi Glass Co., Ltd.. These compositions do not contain a copolymerized cure site monomer.

The fluoroelastomer compositions are generally prepared by free radical emulsion polymerization in the presence of catalyst, activator, buffer, and surfactant. For example, water soluble persulfates may be used as catalysts; sodium bisulfite may be used as an activator; sodium phosphate dibasic heptahydrate may be used as a buffer; and the salts of perfluoroacids may be used as surfactants. Polymerization temperatures may range from 50°–90° C. and pressures may range from 500 to 2000 psig.

The ethylene copolymers suitable for use in this invention are those peroxide-curable copolymers of ethylene and at least one other ester comonomer which are elastomeric on curing, i.e. ethylene copolymer elastomers. The copolymerized ester monomers include $C_1$–$C_8$ alkyl esters of acrylic acid or methacrylic acid. Further, the copolymers do not include copolymerized units of cure site monomers. Such copolymers are well-known in the art and a number of such copolymers are available commercially, for example ethylene methyl acrylate copolymers.

The ethylene content of the copolymers is about 20–55 weight percent of the polymer, preferably 20–45 weight percent. Copolymers having ethylene contents within this range are elastomeric when cured. The alkyl acrylate or alkyl methacrylate comonomers comprise about 55–80 weight percent of the polymer. Alkyl acrylates and alkyl methacrylates suitable for use in the polymers include $C_1$–$C_8$ alkyl esters of acrylic acid or methacrylic acid, for example, the methyl, ethyl, isobutyl, hexyl, and 2-ethylhexyl esters. Methyl, ethyl, and butyl acrylates are preferred. Methyl acrylate is most preferred.

The Mooney viscosity of the ethylene copolymer elastomers useful for preparation of the blends of the present invention is from 10–120, preferably 10–50 (ASTM D-1646, 100° C., 1 rain preheat, viscosity measured at 4 min).

Such copolymers are generally prepared by continuous copolymerization of ethylene, ester comonomer(s), and any additional, optional comonomer in a stirred reactor in the presence of at least one free-radical initiator at temperatures of about from 120° C. to 300° C. and at pressures of about from 130 to 310 MPa. The most effective initiators have half lives of 0.1–1.0 second at the reactor temperature, for example, lauryl peroxide, di-t-butyl peroxide, t-butyl peracetate, di(sec-butyl)peroxy dicarbonate, t-butylperoxy neodecanoate, and t-amylperoxy pivalate. Optionally, the copolymers may be prepared in the presence of about 2–25 wt. % methanol or acetone so that reactor fouling is decreased or eliminated, as disclosed by Hatch et al. in U.S. Pat. No. 5,028,674 and by Statz in U.S. Pat. No. 5,027,593. Following discharge of polymer from the reactor, viscosity can be increased by subjecting the polymer to post-reactor processing as disclosed, for example, by Fisher et al. in U.S. Pat. No. 5,194,516 and by Harrell in U.S. Pat. No. 5,214,108.

Representative examples of specific ethylene copolymer elastomers which can be used in the present invention include ethylene/methyl acrylate, ethylene/methyl methacrylate, ethylene/ethyl acrylate, ethylene/ethyl methacrylate, ethylene/butyl acrylate, ethylene/2-ethylhexyl methacrylate, ethylene/butyl acrylate/carbon monoxide, ethylene/butyl acrylate/glycidyl methacrylate and ethylene/butyl acrylate/acrylic acid. Preferably the copolymers contain copolymerized units of $C_1$–$C_8$ alkyl acrylates or methacrylates. Further representative examples of ethylene copolymer elastomers which are suitable for use in the present invention include terpolymers, for example, ethylene/methyl acrylate/carbon monoxide and ethylene/butyl acrylate/carbon monoxide. Such ethylene copolymers yield elastomeric products when cured in the presence of peroxides.

Peroxides suitable as curing agents are those that decompose rapidly within the temperature range 150°–250° C. Representative examples of organic peroxides that may be employed include dicumyl peroxide, t-butyl perbenzoate, benzoyl peroxide, t-butyl peracetate, 1,1-di(t-butylperoxy) 3,3,5-trimethyl cyclohexane, 2,5-dimethyl-2,5,di-(t-butylperoxy)hexane, 2,5-dimethyl-2,5,di-(t-butylperoxy) hexyne, n-butyl-4,4-bis(t-butylperoxy valerate), and di[1,3-dimethyl-3-(t-butylperoxy)butyl]-carbonate. Use of a combination of more than one peroxide is advantageous in certain circumstances, although generally a single peroxide is sufficient. Typically, about 0.5–5 phr (parts per hundred parts of polymer blend, by weight) of peroxide are utilized. The peroxide can be adsorbed on an inert carrier, the weight of which is not included in the range stated for the peroxide.

A coagent, i.e. a polyunsaturated compound which is capable of cooperating with the peroxide to provide a useful cure, is usually present as part of a peroxide curing agent system. Such compounds include triallyl cyanurate, triallyl isocyanurate, trimethallyl isocyanurate, diallyl maleate, high vinyl low molecular weight butadiene, N,N'-m-phenylene dimaleimide, pentaerythritol triacrylate, pentaerythritol trimethacrylate, trimethylolpropane triacrylate, and trimethylolpropane trimethacrylate. Use of such coagents in curing or crosslinking processes is well-established in the art. More than one coagent may be employed, but generally one coagent is used alone. The amount of coagent can be about 0.1–10 phr, about 0.5–5 phr being preferred.

Optionally, at least one metal compound selected from divalent metal oxides or divalent metal hydroxides can be incorporated into the co-curable polymer blends of this invention. Representative metal compounds include the oxides and hydroxides of magnesium, zinc, calcium, and lead. Magnesium oxide and calcium hydroxide are particularly useful in conjunction with peroxide curing systems. A metal salt of a weak acid can also be incorporated along with the oxide and/or hydroxide. Representative salts of weak acids include stearates, benzoates, carbonates, oxalates, and phosphites of barium, sodium, potassium, lead, and calcium. The amount of metal compound typically used is 0.02–10 wt. parts per 100 wt. parts of polymer blend.

Optionally, at least one organic base can be incorporated into the co-curable polymer blends of this invention. Preferred organic bases are strong bases, having pKa of at least about 10 and desirably at least about 12. Representative of such bases is octadecylamine, available from Akzo Chemicals, Inc. as Armeen 18-D. The amount of organic base utilized is typically 0.02–5 parts by weight per 100 parts by weight of polymer blend.

The blends can also contain conventional fillers such as carbon black, clay, silica, and talc. Other fillers, pigments, antioxidants, stabilizers and the like can also be employed. It is particularly advantageous to add carbon black to the fluoroelastomer to increase its modulus. Usually amounts of about 5–150 parts per hundred parts of the blend polymers are employed. For purposes of the present invention, filler is present in not more than 150 parts, preferably 10–100 parts by weight per hundred parts by weight of the polymers used, most preferably 10–80 parts by weight per hundred parts by weight of the polymers present. The particular amount will depend on the particle size of the filler and the desired hardness of the cured composition. When the blends of the present invention contain fluoroelastomer that is at least 5 weight percent and less than 15 weight percent per 100 parts by weight of the combined fluoroelastomer and ethylene copolymer, the mount of filler present should not be more than 150 parts per hundred of the blend polymers.

The co-curable blends of the present invention may be prepared by rubber compounding techniques known in the art. For example, the uncured fluoroelastomer and ethylene copolymer elastomer may be mixed on a rubber mill or in a Banbury mixer. Additives and curing agent may be added at the time of blending or a masterbatch containing the polymers and a portion of the additives may be prepared which is subsequently compounded with additional additives and curative immediately prior to molding. The compositions are generally cured by press cure at elevated temperatures, usually 160°–210° C., followed by a post cure step during which the molded part is held at an elevated temperature for 2–24 hours to complete the cure process.

The fluoroelastomer is present in the blend in amounts of 5–95 weight percent per 100 parts by weight of the combined fluoroelastomer and ethylene copolymer. Preferably the fluoroelastomer is present in amounts of 15–95 weight percent per 100 parts by weight of the combined fluoroelastomer and ethylene copolymer. Most preferably, the fluoroelastomer is present in amounts of 25–95 weight percent per 100 parts by weight of the combined fluoroelastomer and ethylene copolymer. When cured, the blends of the present invention exhibit enhanced base resistance compared to the cured ethylene copolymer elastomer itself, without evidence of polymer incompatibility.

While it is contemplated that fluoroelastomer and ethylene copolymer elastomer together should constitute the principal polymeric components of the curable blends of this invention, one skilled in the art will recognize the possibility of including other polymers in the blend including other co-curable elastomers.

The compositions of the present invention can be used to prepare general rubber goods, including o-rings, gaskets, shaft seals, and hoses. These compositions provide lower viscosity products having excellent mold flow. They are particularly useful in manufacture of elastomeric articles which are subjected to environments wherein resistance to basic conditions is critical, for example, automotive power train fluids.

Automotive fluids often contain basic additives that provide protection for metal parts and increased service life of the fluids. Such fluids are aggressive towards conventional dipolymer or terpolymer fluoroelastomers based on vinylidene fluoride ($VF_2$) and hexafluoropropylene (HFP). Such fluoroelastomers are either dipolymers of $VF_2$ and HFP or terpolymers of $VF_2$, HFP, and tetrafluoroethylene. Conventional fluoroelastomers are crosslinked by the basic additives in automotive fluids. Such crosslinking is reflected by a reduction in elongation at break of the fluoroelastomers, as determined according to ASTM D-412, after immersion in such fluids. Transmission and gear fluids are especially aggressive toward conventional fluoroelastomers.

The ability of a shaft seal used in a powertrain to function over a range of temperatures is an important property. One critical requirement for a shaft seal is the ability to function without rupture during startup at temperatures below freezing. Brittle point temperature, which is a measure of the impact resistance as a function of temperature, can be used as an indicator of this property. Low brittle point temperatures are consequently desirable.

The invention is now illustrated by the following embodiments, wherein all parts are by weight unless otherwise specified.

EXAMPLES

Compositions for each of the Examples and Control Example described below were prepared by the following general procedure. First, fluoroelastomer and ethylene copolymer elastomer were placed in an internal mixer (B Banbury) at a loading factor of 70%. The polymers were mixed until a chart temperature of approximately 77° C. was reached. The polymer mixture was discharged and sheeted out on a two-roll rubber mill. This preliminary blending step was omitted for the controls based on a single elastomer. Then, the polymer mixture and other ingredients of the desired compound were placed in a B Banbury mixer, again at a 70% loading factor. The ingredients were mixed until a chart temperature of approximately 77° C. was reached, and the compound was discharged and sheeted out on a two-roll rubber mill. Slabs (76 mm×152 mm×1.9 mm) and o-rings (25.4 mm inside diameter×3.5 mm thick) for measurement of vulcanizate properties were molded using a press cure of 177° C. for 10 min followed by a post cure at 200° C. for 8 hours in a circulating air oven.

Tensile stress-strain properties were measured according to ASTM D-412.

Fluid agings were carried out according to ASTM D-471. Agings were performed in automotive transmission fluid (Dexron III ATF) and gear fluid (80W90-EP lube). Agings were carried out for 1 and 6 week periods with fluids being changed every week.

Hardness was measured according to ASTM D-2240.

Brittle point, which reflects low temperature impact resistance, was measured according to ASTM D-746.

Polymers and certain of the curatives used in examples of the invention and controls are identified and defined in Table 1. Polymer compositions in Table 1 are presented on a weight basis. Patent references are cited for general methods of preparing the polymers used.

TABLE 1

POLYMERS

| Identification | Composition, Viscosity, and Reference |
|---|---|
| Fluoroelastomer A | TFE/P[1]<br>Sp. Gravity 1.55<br>F content 55 wt. %<br>$ML_{1+10}$ = 160 at 100° C. |
| Fluoroelastomer B | VF$_2$/HFP/TFE/BTFB[2] = 37/35/26/1.7 wt. %<br>Sp. Gravity 1.9<br>F content 69 wt. %<br>$ML_{1+10}$ = 60 at 121° C. |
| Ethylene Copolymer A | E/MA[3] = 29/71 wt. %<br>$ML_{1+4_0}$ = 22 at 100° C.<br>Prepared according to methods of U.S. Pat. Nos. 3,904,588 and 5,194,516 |

[1]Copolymer of tetrafluoroethylene and propylene.
[2]Copolymer of vinylidene fluoride, hexafluoropropylene, tetrafluoroethylene, and bromotetrafluorobutene.
[3]Copolymer of ethylene and methyl acrylate.

Examples 1–4 and Controls A, B, and C

Fluoroelastomer A was blended with Ethylene Copolymer A and with other ingredients in the proportions shown in Table 2. The resultant compositions were then molded, cured, and tested following the general procedure outlined above. Test results are presented in Table 2. Formulations for Controls A, B, and C are appropriate for Fluoroelastomer A, Ethylene Copolymer A, and Fluoroelastomer B respectively. Formulations for Examples 1–4 reflect the proportions of Fluoroelastomer A and Ethylene Copolymer A in the blends.

As indicated in Table 2, the cured polymer blends of the invention exhibit excellent flexibility and resistance to aggressive automotive fluids. Blends of the present invention provide significantly better retention of elongation ($E_B$) after aging than peroxide cured VF$_2$/HFP-based fluoroelastomers, which are represented by Control C. In addition, the properties of the cured blends of the invention are superior to those of unblended cured ethylene copolymer Control A and nearly equivalent to those of unblended Fluoroelastomer A. The excellent low temperature impact resistance of the blend compositions of the invention is evidenced by the brittle point data. Surprisingly, the brittle points of the compositions of the invention are better (i.e. lower) than would be expected from averaging the results of the individual blend components.

Examples 5–7 and Controls D–E

Fluoroelastomer A was blended with Ethylene Copolymer A and with other ingredients in the proportions shown in Table 3. The resultant compositions were then molded, cured, and tested following the general procedure outlined above. Test results are also presented in Table 3. The formulations for Controls D and E are appropriate for Fluoroelastomer A and Ethylene Copolymer A, respectively. Formulations for Examples 5–7 reflect the proportions of Fluoroelastomer A and Ethylene Copolymer A in the blends.

As illustrated by the data shown in Table 3, the blends of peroxide-curable polymers of the invention exhibit good low temperature impact resistance and resistance to aggressive automotive fluids. Such blends show improved fluid resistance in comparison with the unblended ethylene copolymers by exhibiting superior elongation at break ($E_B$) after prolonged exposure to the fluids. Good low temperature impact resistance of these blends is evidenced by the brittle point data. Likewise, the synergy in brittle point illustrated by the compositions of Examples 1–4 is also evidenced here.

TABLE 2

| COMPOUND | A | 1 | 2 | 3 | 4 | B | C |
|---|---|---|---|---|---|---|---|
| Fluoroelastomer A | 100.0 | 95.0 | 90.0 | 80.0 | 50.0 | — | — |
| Ethylene Copolymer A | — | 5.0 | 10.0 | 20.0 | 50.0 | 100.0 | — |
| Fluoroelastomer B | — | — | — | — | — | — | 100.0 |
| Naugard 445[1] | — | — | 0.5 | 0.5 | 0.8 | 1.0 | — |
| Armeen 18D[2] | 0.5 | 0.5 | 0.5 | 0.5 | 0.5 | 0.5 | — |
| DIAK NO. 7[3] | 3.0 | 3.0 | 3.0 | 3.0 | 2.5 | 2.0 | 2.0 |
| Luperco 101-XL[4] | 4.0 | 4.0 | 4.0 | 4.0 | 4.5 | 5.0 | 3.0 |
| MT Carbon Black (N-990) | 30.0 | 30.0 | 35.0 | 30.0 | — | — | 15.0 |
| SRF Carbon Black (N-762) | — | — | — | 5.0 | 45.0 | 65.0 | — |
| Zinc Oxide | — | — | — | — | — | — | 3.0 |
| Nyad 400[5] | — | — | — | — | — | — | 30.0 |
| | 137.5 | 137.5 | 143.0 | 143.0 | 153.3 | 173.5 | 153.0 |

Vulcanizate

Press Cure 177° C./10 min
Post Cure 200° C./8 hr for A, 1, 2, 3, 4 and B;
Post Cure 200° C./16 hr. for C
Stress Strain and Hardness
Original

| | | | | | | | |
|---|---|---|---|---|---|---|---|
| 100% Modulus, MPa | 5.1 | 5.5 | 6.3 | 6.1 | 7.8 | 4.2 | 6.7 |
| Tensile Strength, MPa | 18.5 | 14.1 | 12.0 | 10.8 | 12.5 | 11.7 | 14.8 |
| Elongation at Break, $E_B$ % | 265 | 310 | 295 | *330 | 225 | 300 | 295 |
| Hardness, Durometer A | 71 | 73 | 75 | 75 | 79 | 74 | 76 |

TABLE 2-continued

| COMPOUND | A | 1 | 2 | 3 | 4 | B | C |
|---|---|---|---|---|---|---|---|
| Fluid Resistance, Dexron III ATF After 150° C./1 Week | | | | | | | |
| 100% Modulus, MPa | 3.9 | 4.4 | 4.7 | 5.1 | 6.6 | 3.6 | 7.1 |
| (% Retained) | (77) | (80) | (74) | (83) | (85) | (85) | (107) |
| Tensile Strength, MPa | 17.4 | 14.3 | 11.6 | 10.9 | 12.2 | 10.0 | 9.8 |
| (% Retained) | (94) | (101) | (97) | (101) | (98) | (85) | (66) |
| Elongation at Break, $E_B$, % | 245 | 280 | 280 | 275 | 195 | 230 | 175 |
| (% Retained) | (92) | (90) | (95) | (83) | (87) | (77) | (59) |
| Hardness, Durometer A | 65 | 64 | 66 | 65 | 70 | 62 | 75 |
| (Points Changed) | (−6) | (−9) | (−9) | (−10) | (−9) | (−12) | (−1) |
| Volume Change, % | 9.8 | 10.2 | 10.5 | 10.9 | 12.4 | 14.6 | 2.0 |
| Fluid Resistance, Dexron III ATF After 150° C./6 Weeks | | | | | | | |
| 100% Modulus, MPa | 3.7 | 5.0 | 5.7 | 6.6 | 9.5 | 7.0 | — |
| (% Retained) | (73) | (91) | (89) | (108) | (122) | (166) | — |
| Tensile Strength, MPa | 16.8 | 14.8 | 12.8 | 12.3 | 13.6 | 12.5 | 5.3 |
| (% Retained) | (91) | (105) | (106) | (113) | (109) | (106) | (36) |
| Elongation at Break, $E_B$, % | 240 | 260 | 270 | 255 | 145 | 150 | 55 |
| (% Retained) | (91) | (84) | (92) | (77) | (64) | (50) | (19) |
| Hardness, Durometer A | 63 | 66 | 68 | 68 | 73 | 69 | 80 |
| (Points Changed) | (−8) | (−7) | (−7) | (−7) | (−6) | (−5) | (4) |
| Volume Change, % | 11.0 | 11.1 | 11.1 | 11.5 | 13.6 | 15.8 | 4.1 |
| Fluid Resistance: Gear Lube 80W90-EP After 150° C./1 Week | | | | | | | |
| 100% Modulus, MPa | 3.8 | 4.6 | 5.0 | 5.4 | 7.1 | 4.1 | — |
| (% Retained) | (74) | (84) | (78) | (88) | (91) | (98) | — |
| Tensile Strength, MPa | 15.6 | 12.3 | 10.3 | 9.6 | 11.9 | 10.5 | 6.3 |
| (% Retained) | (84) | (87) | (86) | (89) | (96) | (89) | (43) |
| Elongation at Break, $E_B$, % | 270 | 295 | 300 | 305 | 200 | 230 | 90 |
| (% Retained) | (102) | (95) | (102) | (92) | (89) | (77) | (31) |
| Hardness, Durometer A | 66 | 69 | 71 | 69 | 74 | 67 | 77 |
| (Points Changed) | (−5) | (−4) | (−4) | (−6) | (−5) | (−7) | (1) |
| Volume Change, % | 6.1 | 6.3 | 6.5 | 7.2 | 8.3 | 10.7 | 2.1 |
| Fluid Resistance: Gear Lube 80W90-EP After 150° C./6 Weeks | | | | | | | |
| 100% Modulus, MPa | 3.6 | 4.9 | 5.6 | 7.5 | — | — | — |
| (% Retained) | (70) | (89) | (88) | (122) | — | — | — |
| Tensile Strength, MPa | 15.5 | 12.2 | 10.7 | 10.7 | 8.7 | 7.1 | 4.5 |
| (% Retained) | (84) | (87) | (89) | (99) | (70) | (61) | (30) |
| Elongation at Break, $E_B$, % | 265 | 295 | 255 | 210 | 80 | 75 | 10 |
| (% Retained) | (100) | (95) | (86) | (64) | (36) | (25) | (3) |
| Hardness, Durometer A | 65 | 69 | 71 | 73 | 77 | 72 | 87 |
| (Points changed) | (−6) | (−4) | (−4) | (−2) | (−2) | (−2) | (11) |
| Volume Change | 6.5 | 7.0 | 7.4 | 8.5 | 12.1 | 17.2 | 2.6 |
| Brittle Point, °C. | −57 | −57 | −57 | −51 | −46 | −25 | −46 |

[1] 4,4'Bis(α,α'-dimethylbenzyl)diphenylamine
[2] Octadecylamine
[3] Triallylisocyanurate
[4] 2,5-Dimethyl-2,5-(t-butylperoxy)hexane(45 wt. % on inert support)
[5] Calcium Metasilicate

TABLE 3

| COMPOUND (Parts By Weight) | D | 5 | 6 | 7 | E |
|---|---|---|---|---|---|
| Fluoroelastomer A | 100.0 | 30.0 | 20.0 | 10.0 | — |
| Ethylene Copolymer A | — | 70.0 | 80.0 | 90.0 | 100.0 |
| Naugard 445[1] | — | 0.7 | 0.8 | 0.9 | 1.0 |
| Armeen 18D[2] | 0.5 | 0.5 | 0.5 | 0.5 | 0.5 |
| DIAK No. 7[3] | 3.0 | 2.5 | 2.0 | 2.0 | 2.0 |
| Luperco 101-XL[4] | 4.0 | 4.5 | 5.0 | 5.0 | 5.0 |
| MT Carbon Black (N-990) | 30.0 | — | — | — | — |
| SRF Carbon Black (N-762) | — | 50.0 | 55.0 | 60.0 | 65.0 |
| | 137.5 | 158.2 | 163.3 | 168.4 | 173.5 |
| Vulcanizate Properties | | | | | |
| Press Cure 177° C./10 min | | | | | |
| Post Cure 200° C./8 hr | | | | | |
| Stress-Strain and Hardness Original | | | | | |
| 100% Modulus, MPa | 4.4 | 6.1 | 4.9 | 4.5 | 4.0 |
| Tensile Strength, MPa | 17.6 | 12.8 | 12.3 | 12.3 | 12.1 |
| Elongation at Break, % | 280 | 240 | 260 | 285 | 315 |
| Hardness, Durometer A 17 | 72 | 76 | 76 | 75 | 74 |
| Fluid Resistance: Dexron III AFT after 150° C./1 Week | | | | | |
| 100% Modules, MPa | 3.2 | 5.3 | 4.6 | 3.9 | 3.4 |
| (% Retained) | (72) | (87) | (94) | (86) | (84) |
| Tensile Strength, MPa | 16.6 | 10.4 | 10.4 | 10.3 | 9.7 |

TABLE 3-continued

| COMPOUND (Parts By Weight) | D | 5 | 6 | 7 | E |
|---|---|---|---|---|---|
| (% Retained) | (95) | (81) | (85) | (84) | (80) |
| Elongation at Break, $E_B$, % | 285 | 185 | 200 | 215 | 235 |
| (% Retained) | (102) | (77) | (77) | (75) | (75) |
| Hardness, Durometer A | 64 | 65 | 64 | 61 | 59 |
| (Points Changed) | (−8) | (−11) | (−12) | (−14) | (−15) |
| Volume Changed, % | 10.5 | 14.4 | 14.2 | 15.0 | 15.5 |
| Fluid Resistance: Dexron III ATF after 150° C./6 Weeks | | | | | |
| 100% Modulus, MPa | 3.4 | — | — | — | — |
| (% Retained) | (78) | | | | |
| Tensile Strength, MPa | 16.9 | 8.6 | 8.6 | 7.0 | 8.6 |
| (% Retained) | (97) | (67) | (70) | (57) | (72) |
| Elongation at Break, $E_B$, % | 253 | 70 | 70 | 65 | 75 |
| (% Retained) | (91) | (29) | (27) | (23) | (24) |
| Hardness, Durometer A | 64 | 76 | 74 | 74 | 74 |
| (Points Changed) | (−8) | (0) | (−2) | (−1) | (0) |
| Volume Change, % | 11.7 | 17.1 | 17.4 | 18.4 | 18.3 |
| Fluid Resistance: Gear Lube 80W90-EP After 150° C./1 Week | | | | | |
| 100% Modulus, MPa | 3.6 | 5.8 | 4.4 | 3.9 | 3.4 |
| (% Retained) | (81) | (94) | (90) | (88) | (86) |
| Tensile Strength, MPa | 15.7 | 10.4 | 10.0 | 9.5 | 9.8 |
| (% Retained) | (89) | (81) | (81) | (78) | (81) |
| Elongation at Break, $E_B$, % | 285 | 170 | 195 | 200 | 235 |
| (% Retained) | (102) | (71) | (75) | (70) | (75) |
| Hardness, Durometer A | 67 | 71 | 68 | 66 | 66 |
| (Points Changed) | (−5) | (−5) | (−8) | (−9) | (−8) |
| Volume Change, % | 6.3 | 10.6 | 10.8 | 11.5 | 11.8 |
| Fluid Resistance: Gear Lube 80W90-EP After 150° C./6 Weeks | | | | | |
| 100% Modules, MPa | 3.0 | — | — | — | — |
| (% Retained) | (69) | | | | |
| Tensile Strength, MPa | 14.8 | 7.3 | 6.6 | 6.5 | 6.2 |
| (% Retained) | (85) | (57) | (54) | (53) | (52) |
| Elongation at Break, $E_B$, % | 283 | 75 | 78 | 75 | 75 |
| (% Retained) | (102) | (31) | (30) | (27) | (24) |
| Hardness, Durometer A | 65 | 74 | 72 | 74 | 73 |
| (Points Changed) | (−7) | (−2) | (−4) | (−1) | (−1) |
| Volume Change, % | 7.0 | 14.9 | 15.7 | 17.0 | 17.7 |
| Brittle Point, °C. | −54 | −41 | −25 | −24 | −24 |

[1]4,4'Bis(α,α'-dimethylbenzyl)diphenylamine
[2]Octadecylamine
[3]Triallylisocyanurate
[4]2,5-Dimethyl-2,5-(t-butylperoxy)hexane(45 wt. % on inert support)

I claim:

1. A co-curable elastomeric blend composition comprising:

(A) at least about 15 percent by weight, based on the total weight of components (A) and (B), of a copolymer comprising copolymerized units of tetrafluoroethylene and an olefin, and having at least about 45 weight percent fluorine; and (B) at least 5 percent by weight, based on the total weight of components (A) and (B), of at least one ethylene copolymer comprising copolymerized units of
  (1) ethylene and
  (2) at least one polar comonomer selected from the group consisting of alkyl acrylates and alkyl methacrylates wherein the polar comonomer comprises at least 55–80 percent by weight of said ethylene copolymer;

wherein neither the copolymer of component (A) nor the copolymer of component (B) contains a copolymerized curesite monomer.

2. An elastomeric blend of claim 1 wherein component (A) is at least 25 percent by weight of the total weight of components (A) and (B).

3. An elastomeric blend of claim 1 wherein the copolymer comprising copolymerized units of tetrafluoroethylene and an olefin is a copolymer of tetrafluoroethylene and propylene.

4. An elastomeric blend of claim 1 wherein the ethylene copolymer of component (B) is a copolymer of ethylene and an alkyl acrylate.

5. An elastomeric blend of claim 4 wherein the alkyl acrylate is methyl acrylate.

6. An elastomeric blend of claim 1 wherein the ethylene copolymer of component (B) is a copolymer of ethylene and an alkyl methacrylate.

7. An elastomeric blend of claim 1 wherein the copolymer comprising copolymerized units of tetrafluoroethylene and an olefin is a copolymer of tetrafluoroethylene, propylene, and vinylidene fluoride.

8. A co-curable elastomeric blend composition comprising:

(A) at least about 15 percent by weight, based on the total weight of components (A) and (B), of a copolymer having copolymerized units of tetrafluoroethylene and an olefin, and having at least about 45 weight percent fluorine;

(B) at least 5 percent by weight, based on the total weight of components (A) and (B), of at least one ethylene copolymer comprising copolymerized units of
  (1) ethylene and
  (2) at least one polar comonomer selected from the group consisting of alkyl acrylates and alkyl methacrylates, wherein the polar comonomer comprises at least 55–80 percent by weight of said ethylene copolymer; and (C) an organic peroxide curing agent, capable of crosslinking the copolymers of component (A) and component (B) independently, in an amount effective for crosslinking both (A) and (B);

wherein neither the copolymer of component (A) nor the copolymer of component (B) contains a curesite monomer.

9. A co-curable elastomeric blend composition comprising:

(A) at least about 5 percent by weight, based on the total weight of components (A) and (B), of a copolymer having copolymerized units of tetrafluoroethylene and an olefin, and having at least about 45 weight percent fluorine;

(B) at least 5 percent by weight of components (A) and (B), of at least one ethylene copolymer comprising copolymerized units of
  (1) ethylene and
  (2) at least one polar comonomer selected from the group consisting of alkyl acrylates and alkyl methacrylates, wherein the polar comonomer comprises at least 55–80 percent by weight of said ethylene copolymer; and (C) not more than 150 parts by weight of a filler per hundred parts by weight of the components (A) and (B);

wherein neither the copolymer of component (A) nor the copolymer of component (B) contains a copolymerized curesite monomer.

10. An elastomeric blend of claim 9 wherein the copolymer comprising copolymerized units of tetrafluoroethylene and an olefin is a copolymer of tetrafluoroethylene and propylene.

11. An elastomeric blend of claim 9 wherein the ethylene copolymer of component (B) is a copolymer of ethylene and an alkyl acrylate.

12. An elastomeric blend of claim 11 wherein the alkyl acrylate is methyl acrylate.

13. An elastomeric blend of claim 9 wherein the ethylene copolymer of component (B) is a copolymer of ethylene and an alkyl methacrylate.

14. An elastomeric blend of claim 9 further comprising at least one peroxide curing agent.

15. An elastomeric blend of claim 9 wherein the blend contains 10 to 100 parts by weight of a filler per hundred parts by weight of components (A) and (B).

16. An elastomeric blend of claim 9 wherein the blend contains 10–80 parts by weight of a filler per hundred parts by weight of components (A) and (B).

17. An elastomeric blend of claim 9 wherein the copolymer comprising copolymerized units of tetrafluoroethylene and an olefin is a copolymer of tetrafluoroethylene, propylene, and vinylidene fluoride.

* * * * *